US008534622B2

(12) United States Patent
Vanover (10) Patent No.: US 8,534,622 B2
(45) Date of Patent: Sep. 17, 2013

(54) MAST MOUNTING SYSTEM

(76) Inventor: Scott Vanover, Odessa, FL (US)

( * ) Notice: Subject to any disclaimer, the term of this patent is extended or adjusted under 35 U.S.C. 154(b) by 64 days.

(21) Appl. No.: 13/199,979

(22) Filed: Sep. 14, 2011

(65) Prior Publication Data

US 2012/0234992 A1    Sep. 20, 2012

Related U.S. Application Data

(60) Provisional application No. 61/465,156, filed on Mar. 15, 2011.

(51) Int. Cl.
| F16M 13/02 | (2006.01) |
| E04H 12/24 | (2006.01) |
| G09F 7/18  | (2006.01) |

(52) U.S. Cl.
USPC .................... 248/218.4; 248/219.4; 211/100; 211/171

(58) Field of Classification Search
USPC .............. 248/122.1, 123.11, 123.2, 125.9, 248/176.1, 292.11, 291.1, 218.4, 219.2, 219.3, 248/219.4; 343/880, 882, 890, 891, 892; 211/70.6, 96, 98, 99, 100, 101, 102, 171, 211/172; 396/419, 427, 428
See application file for complete search history.

(56) References Cited

U.S. PATENT DOCUMENTS

| 4,819,006 | A  | * | 4/1989  | Whitesides et al. | 343/880 |
| 5,330,084 | A  | * | 7/1994  | Peters | 224/506 |
| 5,752,636 | A  | * | 5/1998  | Manley | 224/405 |
| 5,918,841 | A  | * | 7/1999  | Sweere et al. | 248/123.11 |
| 6,575,652 | B2 | * | 6/2003  | Krauss | 403/49 |
| 6,848,661 | B2 | * | 2/2005  | Baldasari | 248/218.4 |
| 6,873,304 | B1 | * | 3/2005  | Malhotra | 343/890 |
| 7,261,263 | B2 | * | 8/2007  | Baker et al. | 248/218.4 |
| 7,385,564 | B2 | * | 6/2008  | Zihlman | 343/878 |
| 8,083,192 | B2 | * | 12/2011 | Wells et al. | 248/218.4 |
| 2005/0001781 | A1 | * | 1/2005 | Antoine | 343/878 |
| 2006/0197000 | A1 | * | 9/2006 | Meltzer | 248/219.4 |
| 2010/0201599 | A1 | * | 8/2010 | Yeh | 343/882 |

* cited by examiner

*Primary Examiner* — Jonathan Liu
*Assistant Examiner* — Guang H Guan
(74) *Attorney, Agent, or Firm* — Arthur W. Fisher, III (57) ABSTRACT

A mast mount system for mounting accessories on a mobile elevated pole or mast comprising a pole mount assembly including a mounting collar comprising a pair of hingedly coupled pole mounting clamp members to secure the mounting collar to the elevated pole or mast and an accessory mount assembly coupled to the pole mount assembly by an intermediate coupler, the assembly mount assembly comprises an accessory attachment arm having a proximal end portion and a distal end portion pivotally mounted to the intermediate coupler at the proximal end thereof and an accessory support member pivotally mounted to the distal end thereof to support the accessory thereon such that the accessory is positioned relative to the elevated pole or mast without the use of a tool.

18 Claims, 8 Drawing Sheets

MAST MOUNTING SYSTEM

CROSS-REFERENCE

This application claims priority from provisional patent application Ser. No. 61/465,156 filed Mar. 15, 2011.

BACKGROUND OF THE INVENTION

1. Field of the Invention

A mast mount system for mounting accessories on a mobile elevated pole or mast for field communications, surveillance, lightning protection, weather station and the like.

2. Description of the Prior Art

Numerous efforts have been made to design temporary or portable mast supports for use with mobile masts.

U.S. Pat. No. 6,951,326 shows a mast support for a multi-section mast comprising a central mast support sleeve having a plurality of connector brackets extending outwardly from the outer surface thereof and a correspondingly plurality of support legs each pivotally coupled to the upper portion of the corresponding connector bracket and slidably coupled to the mid to lower portion of the corresponding connector member to permit the support legs to be selectively moved between a stored and deployed position and to advance successive mast sections through the central mast support sleeve from beneath or below the central mast support sleeve.

U.S. Pat. No. 4,338,875 discloses a clamping device to fit over and clamp to a rail of a boat including head nuts for tightened without the use of special tools.

U.S. Pat. No. 5,082,037 teaches an apparatus for mounting tools capable of adjustment in both vertically and horizontally. An L-shaped support section slidingly engages a second support member having a mounting plate fixed thereto with a plurality of elongated to mount various tools to provide a secure mounting platform at remote locations.

U.S. Pat. No. 5,252,985 discloses a whip-tilt adapter including a vertical shaft for connection to an antenna mount, a bottom section of the antenna, a near-horizontal member having a port to connect to the antenna, and optionally a vertical port for an antenna connection.

U.S. Pat. No. 5,835,068 relates to a microwave radio frequency unit/antenna system includes a microwave transceiver/antenna unit and a mounting structure support element. The mounting structure support element permits the microwave transceiver/antenna unit to be adjusted in three degrees of freedom.

U.S. Pat. No. 5,982,340 describes a satellite dish mounting system including a vertical support member and a horizontal support member extending from the vertical support member having a satellite antenna dish mounted thereon.

U.S. Pat. No. 6,452,567 depicts an antenna mounting system for the directional antennae of a point-to-multipoint wave communication system and methods of supporting such antennae for selectively directing the beam thereof. The adjustment of the antenna in two orthogonal directions is disclosed with quick connect/disconnect latch for attaching individual antenna elements to the antenna mount.

U.S. Pat. No. 6,494,327 describes a hanger assembly comprising a vertical post, at least two fixing devices securely mounted to the vertical post at different levels, and at least two hanger members securely attached to an associated fixing device for supporting at least one object. The fixing devices are slidable along a vertical direction allowing adjustment in the levels of the fixing devices relative to the vertical post.

U.S. RE39,661 shows a self supporting cantilever support apparatus for mounting a satellite dish antenna comprising a receiver tube having a foot plate mounted on one end and a square telescope tube inserted and adjustably mounted within the receiver tube. Slotted holes formed in the plate to accommodate various types of satellite dishes.

Additional examples of the prior art are found in U.S. Pat. No. 2,243,517; U.S. Pat. No. 3,510,877; U.S. Pat. No. 4,161,735; U.S. Pat. No. 5,926,151; U.S. Pat. No. 5,933,123; U.S. Pat. No. 5,943,024; U.S. Pat. No. 5,969,692; U.S. Pat. No. 5,971,345; U.S. Pat. No. 6,031,508; U.S. Pat. No. 6,232,928; U.S. Pat. No. 6,283,425; U.S. Pat. No. 6,342,870; U.S. Pat. No. 6,407,713; U.S. Pat. No. 6,512,492; U.S. Pat. No. 6,664,937; U.S. Pat. No. 6,848,661; U.S. Pat. No. 6,873,304; U.S. Pat. No. 7,027,007; U.S. Pat. No. 7,057,575; U.S. Pat. No. 7,183,996; U.S. Pat. No. 7,227,505; U.S. Pat. No. 7,253,785; U.S. Pat. No. 7,432,875; U.S. Pat. No. 7,665,699; US 2001/0015707; US 2009/0267860; U.S. D 363,936; U.S. D 473,129 and JP 59-015,306.

SUMMARY THE INVENTION

The present invention relates to a mast mounting system for mounting at least one accessory on a mobile elevated pole or mast assembly for field communications, surveillance, lightning protection, weather station and the like comprising a pole mount assembly and an accessory mount assembly coupled thereto by an intermediate coupler.

The pole mount assembly comprises a mounting collar to engage and secure the pole mount assembly to the periphery of the elevated pole or mast.

The accessory mount assembly comprises a proximal bracket mount and a distal bracket mount interconnected by an elongated member or bar. The proximal end portion of the elongated member or bar is pivotally mounted to the proximal bracket mount; while, the distal end portion of the elongated member or bar pivotally mounted to the distal bracket mount.

In use, the pole mount assembly is secured to the mobile elevated pole or mast assembly at the described height. The proximal bracket mount of the accessory mount assembly is mounted to the pole mount assembly.

The elongated member or bar is then pivoted to the desired angular position and held in place. Finally, the distal bracket mount of the accessory mount assembly is similarly positioned and held in place.

Once assembled and so positioned, the accessory is secured to the distal bracket mount.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE INVENTION

Figure 1:
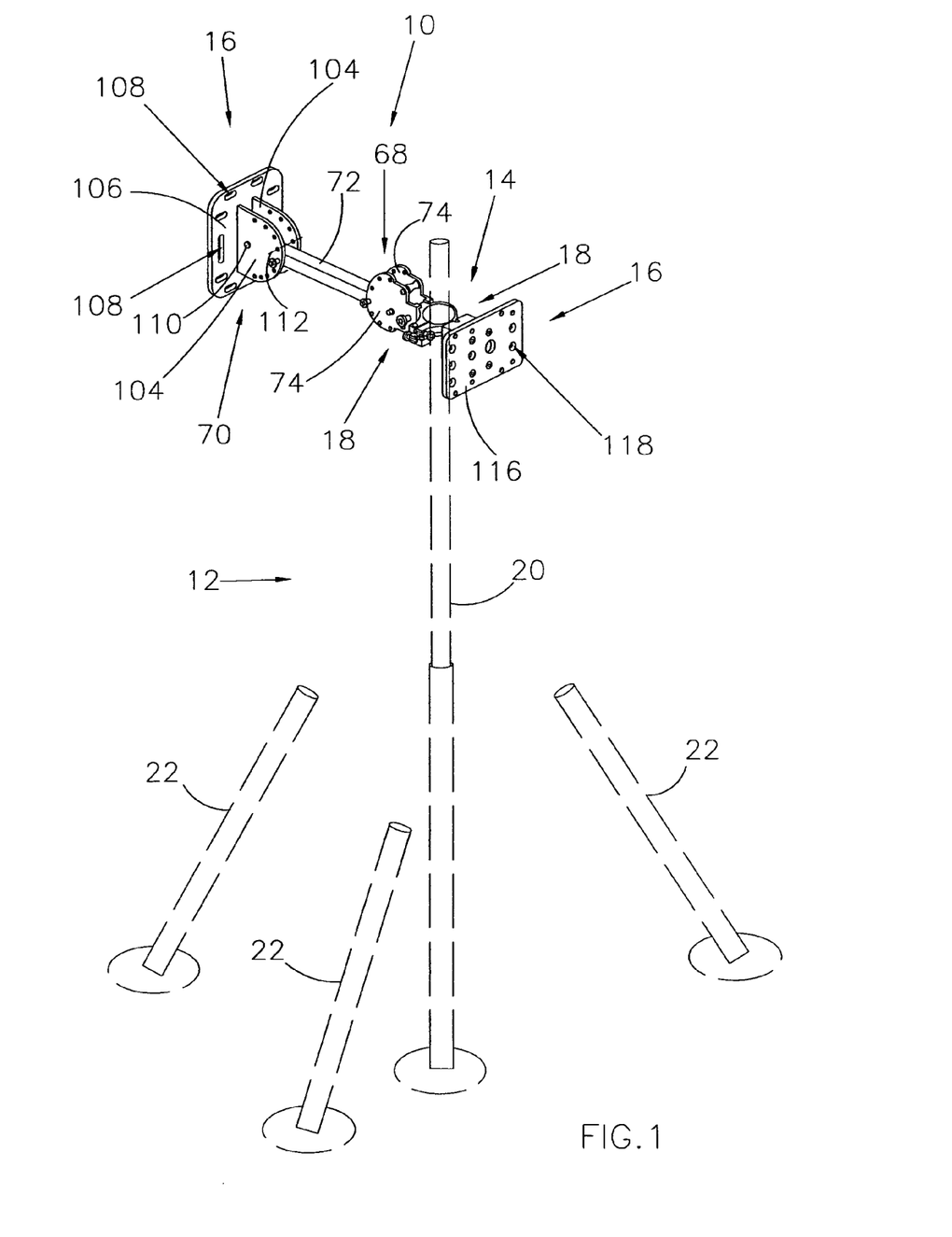
FIG. 1 is a perspective view of the mast mount system of the present invention secured to the pole or mast of a mobile elevated pole assembly.
Figure 2:
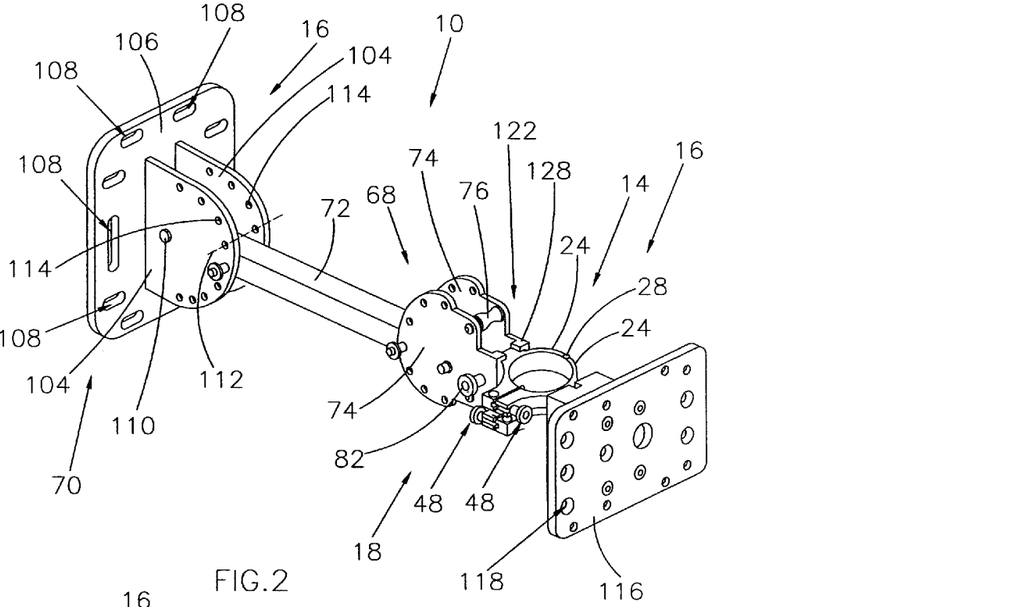
FIG. 2 is a detailed perspective view of the mast mount system of the present invention.
Figure 3:
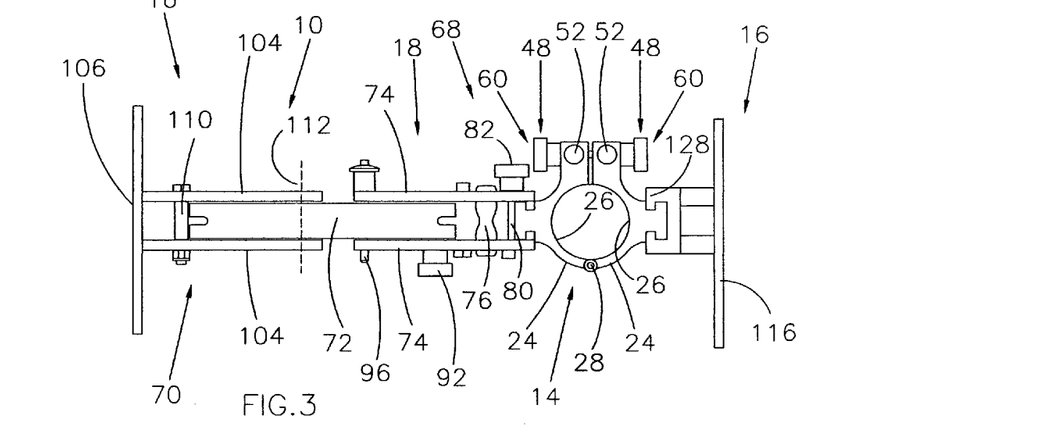
FIG. 3 is a detailed top view of the mast mount system of the present invention.

As best shown in FIGS. 1 through 3, the present invention relates to a mast mount system generally indicated as 10 for mounting at least one accessory on a mobile elevated pole or mast assembly generally indicated as 12 for field communications, surveillance, lightning protection, weather station and the like.

The mast mount system 10 comprises a pole mount assembly generally indicated as 14 and an accessory mount assembly generally indicated as 16 coupled thereto by an intermediate coupler generally indicated as 18.

The mobile elevated pole or mast assembly 12 comprises an elevated pole or mast 20 held in operative position by a plurality of support legs or members each indicated as 22.

Figure 4:
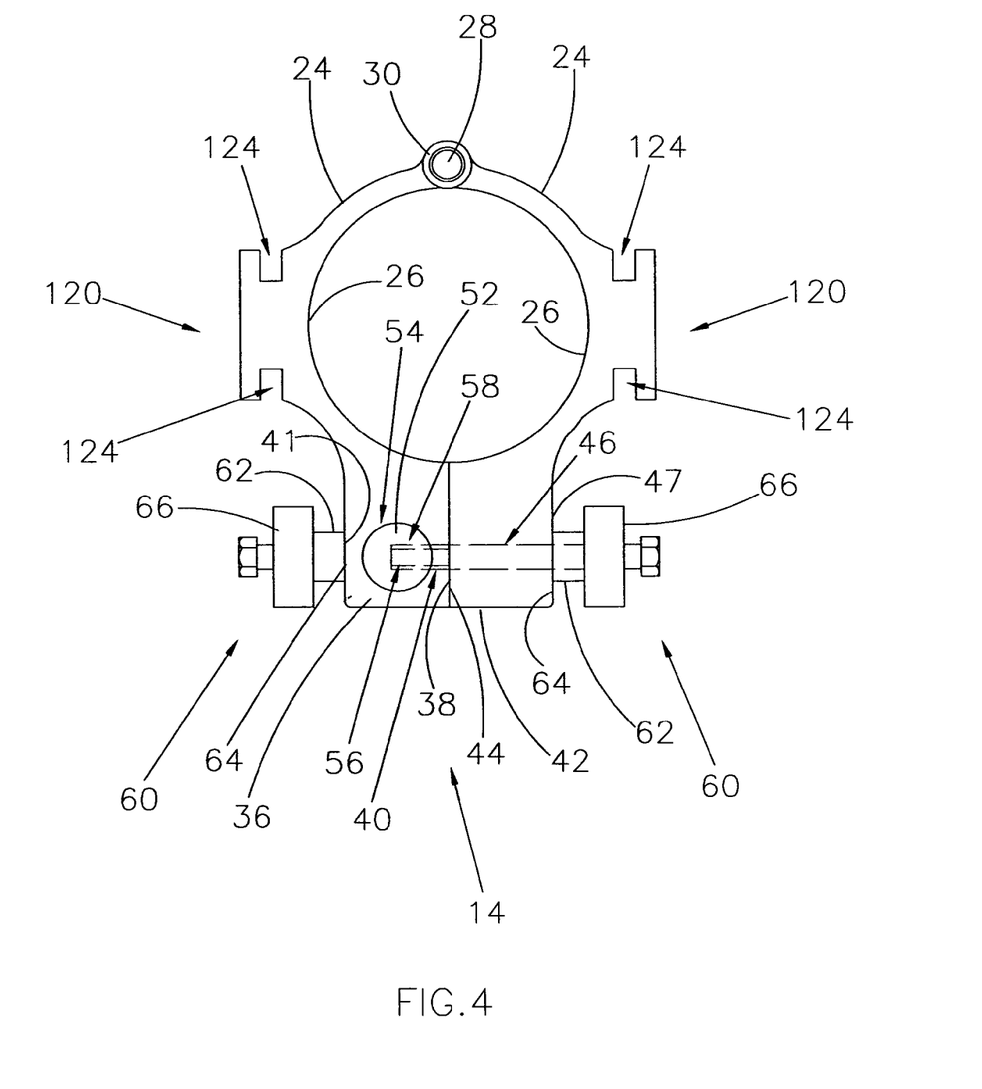
FIG. 4 is a detailed top view of the pole mount assembly of the present invention.
Figure 5:
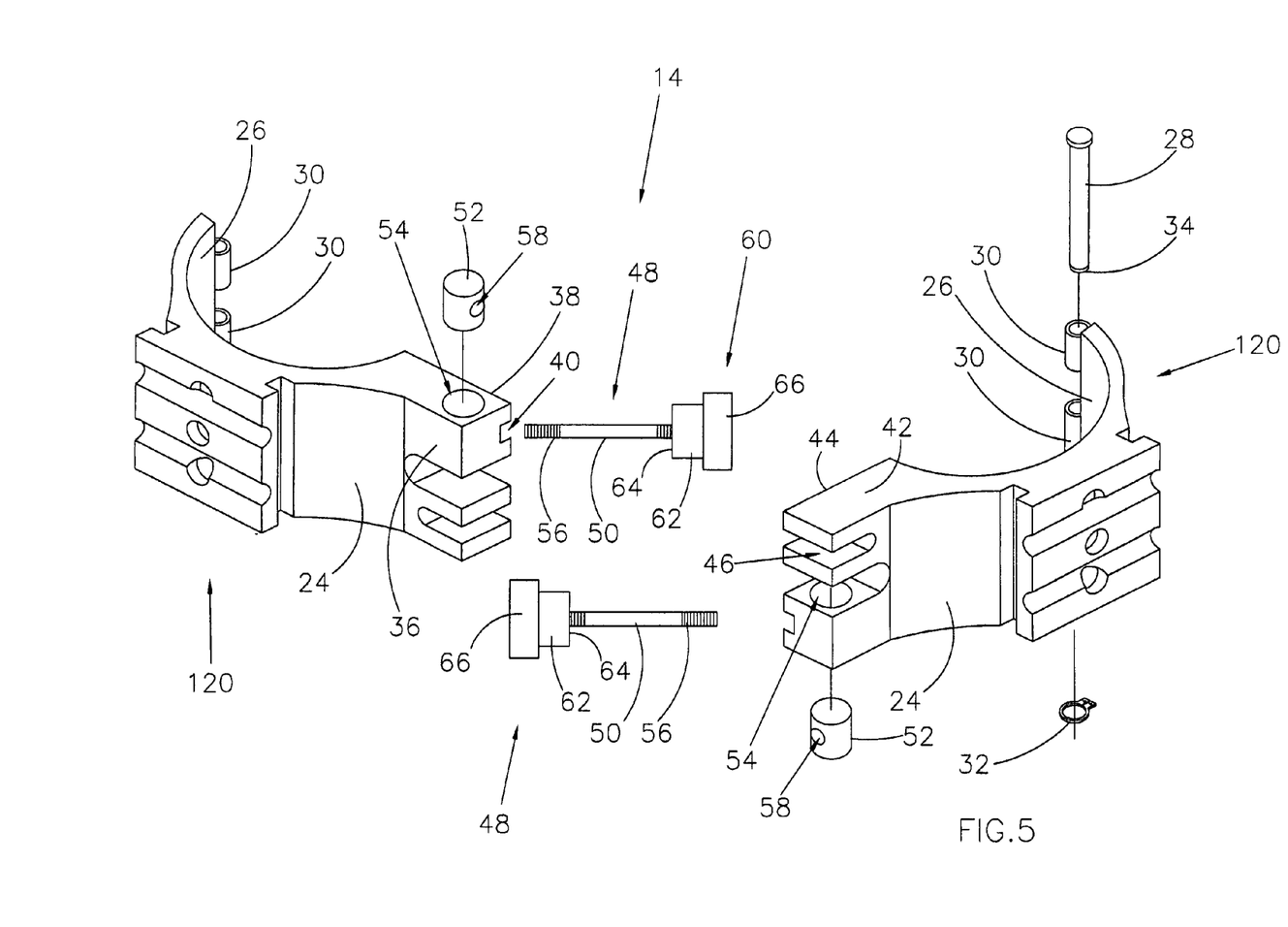
FIG. 5 is a detailed exploded perspective view of the pole mast assembly of the present invention.
Figure 6:
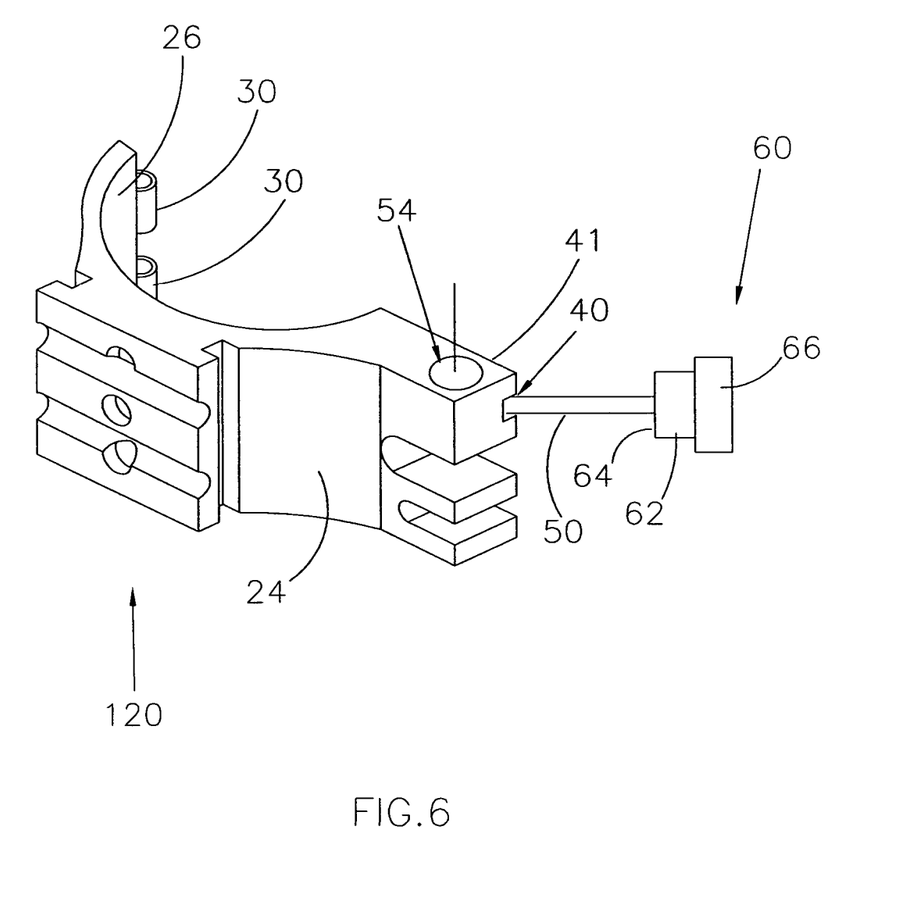
FIG. 6 is a detailed perspective view of a pole mounting clamp member of the mounting collar of the pole mount assembly of the present invention.

As best shown in FIGS. 4 through 6, the pole mount assembly 14 comprises a mounting collar including a pair of pole mounting clamp members each indicated as 24 including an inner concave pole or mast engagement surface 26 hingedly coupled together by a hinge member or pin 28 extending through at least one hinge sleeve 30 formed on corresponding end portions of each pole mounting clamp member 24 to engage and secure the mounting collar of the pole mount assembly 18 to the periphery of the elevated pole or mast 20. The hinge member or pin 28 is maintained or secured within the hinge sleeves 30 by a ring retainer 32 coupled to the lower end portion 34 of the hinge member or pin 28.

The mounting collar of the pole mount assembly 14 further comprises at least one collar securing assembly to secure the pole mount assembly 14 of the mast mount system 10 to the elevated pole or mast 20 of the mobile elevated pole or mast assembly 12.

The collar securing assembly comprises a first collar extension 36 including a first securing surface 38 having a securing notch 40 formed thereon formed on the end portion of one of the pole mounting clamp members 24 opposite the corresponding hinge sleeve 30 formed on the same pole mounting clamp member 24 and a first outer securing surface 41 and a second collar extension 42 including a second securing surface 44 having a securing groove 46 formed on the end portion of the other of the pole mounting clamp members 24 opposite the corresponding hinge sleeve 30 formed on the same pole mounting clamp member 24 and a second outer securing surface 47 wherein the first securing surface 38 and the second securing surface 42 are held in operative engagement relative to each other when a collar locking member generally indicated as 48 is secured in a locked position to secure the mounting collar of the pole mount assembly 14 in place on the elevated pole or mast 20. The collar locking member 48 comprises an elongated member 50 coupled to the first collar extension 36 by a substantially cylindrical pivot member 52 rotatably disposed within a substantially cylindrical recess 54 disposed adjacent the notch 40 by a plurality of external threads generally indicated as 56 formed on one end of the elongated member 50 operatively engaging a plurality of internally disposed threads generally indicated as 58 formed within the substantially cylindrical pivot member 52 and a locking knob generally indicated as 60 including a reduced locking portion 62 having a collar locking surface 64 and an enlarged lock positioning member 66.

To secure the pole mount assembly 14 of the mast mount system 10 to the elevated pole or mast 22 of the mobile elevated pole or mast assembly 12 the pole mounting members 24 are positioned vertically on the elevated pole or mast 22 and closed around the extended pole or mast 22 such that the first inner securing surface 38 and the second securing surface 44 engage each other. The collar locking member 48 is moved into a locking position as shown in FIGS. 2 through 5 by grasping the enlarged lock positioning member 66 and pivoting the elongated member 50 on the substantially cylindrical pivot member 52 and into the securing groove 46 and the securing notch 40 and rotatably or moving the elongated member 50 inwardly relative to the substantially cylindrical post member 52 tightening the collar locking surface 64 against the second outer securing surfaces 47 locking the pole mounting members 24 in place with the concave surface 26 thereof press fitted against the outer surface of the elevated pole or mast 22 of the mobile elevated pole or mast assembly 12.

As best shown in FIG. 5, a pair of collar locking members 48 may be disposed vertically relative to each other and having the locking knobs 60 disposed on opposite sides of the first inner securing surface 38 and the second inner securing surface 44.

As shown in FIGS. 1 through 3, the accessory mount assembly 16 comprises a proximal bracket mount and a distal bracket mount generally indicated as 68 and 70 respectively interconnected by an elongated member or bar 72.

Figure 7:
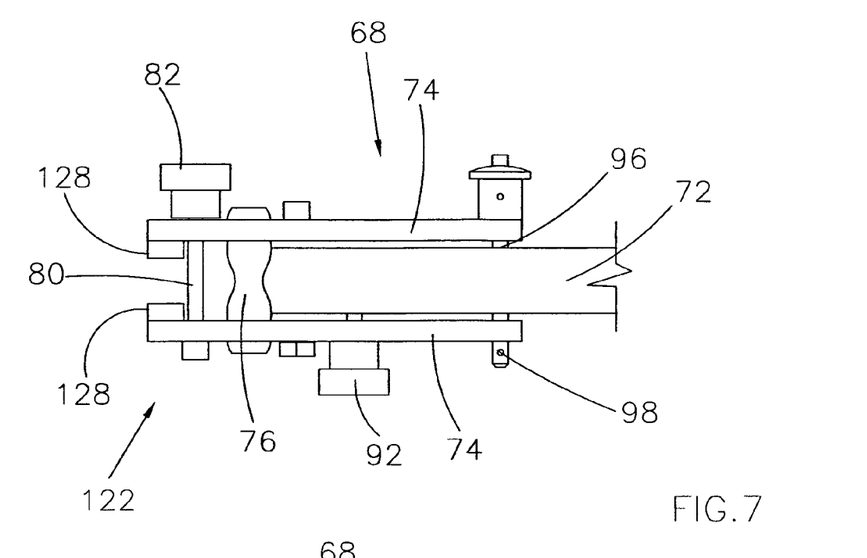
FIG. 7 is a detailed top view of the proximal bracket mount of the present invention.
Figure 8:
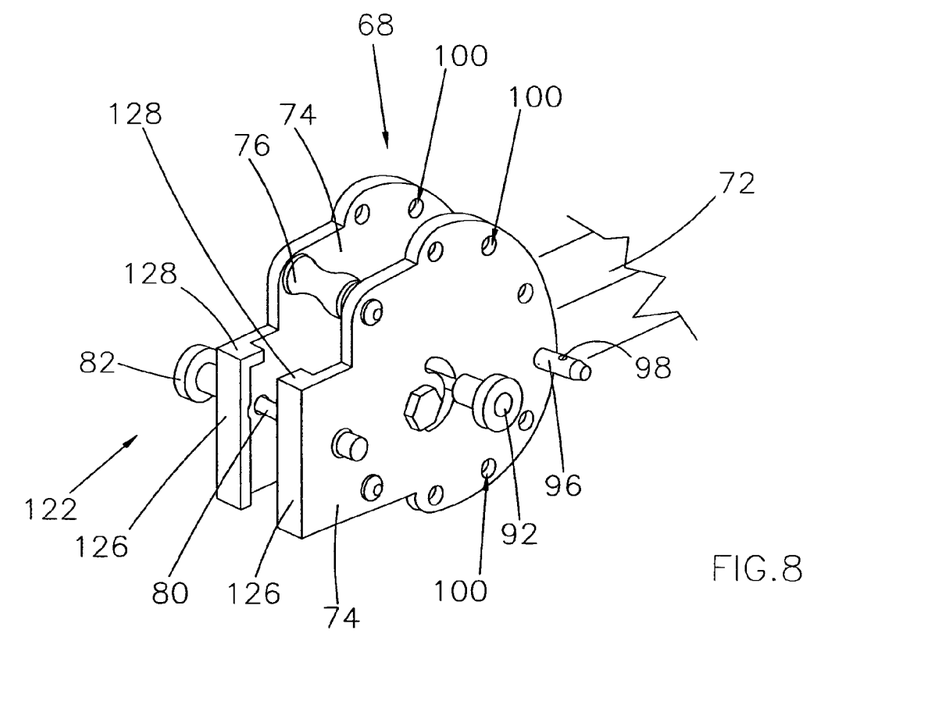
FIG. 8 is a detailed perspective view of the proximal bracket mount of the present invention.
Figure 9:
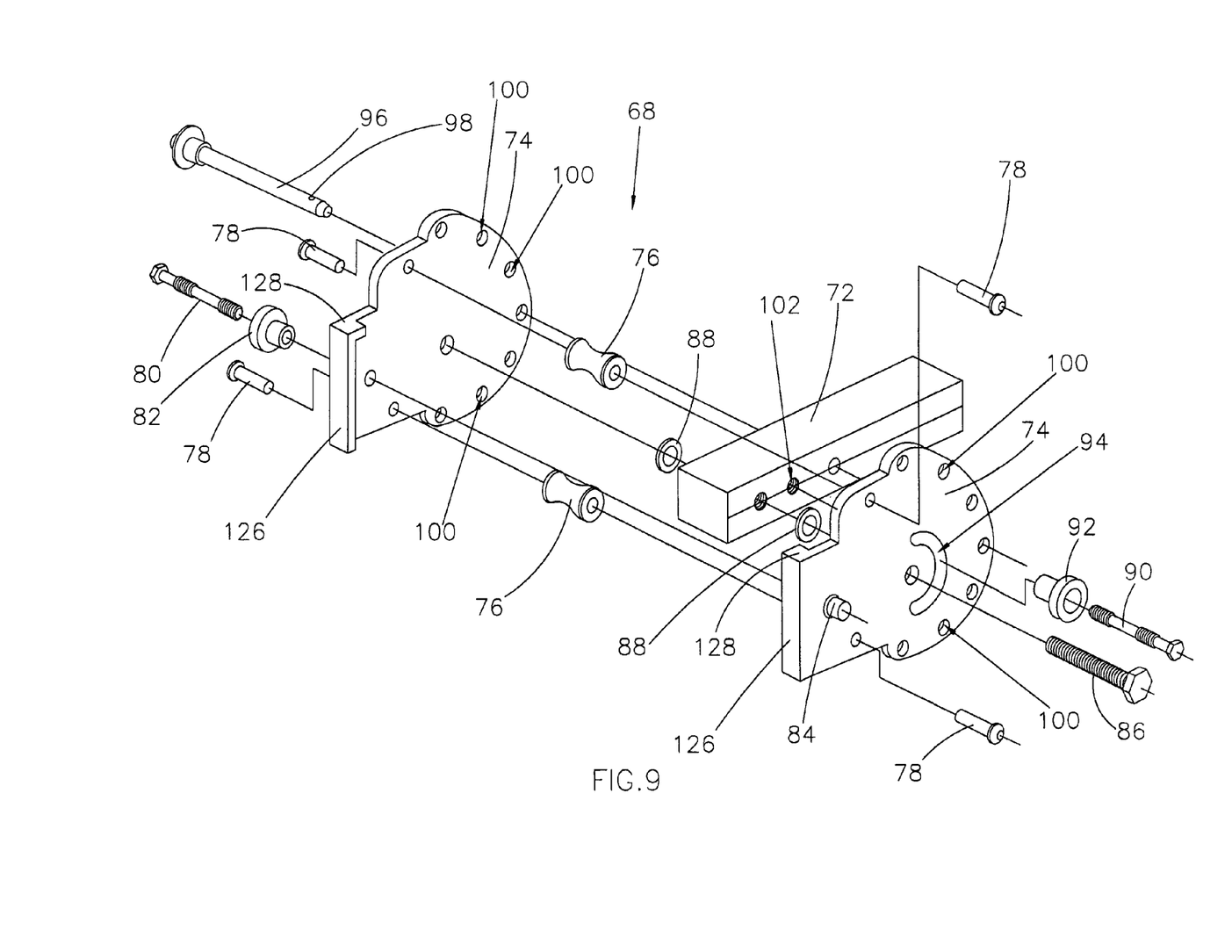
FIG. 9 is a detailed exploded perspective view of the proximal bracket mount of the present invention.

As best shown in FIGS. 7 through 9, the proximal bracket mount 68 comprises a pair of substantially parallel side plates or members each indicated as 74 held in spaced relationship relative to each other by at least one spacer 76 held in place by a fastener 78 at each end thereof in cooperation with a laterally adjustable fastening member or bolt 80 including an adjustment knob 82 formed on one end portion thereof and held in place by a fastener or nut 84. The proximal end portion of the elongated member or bar 72 is pivotally mounted between the substantially parallel side plates or members 74 by a bar mounting member or bolt 86. A washer or spacer 88 is disposed between each side of the elongated member or bar 72 and the inside surface of each substantially parallel side plate or member 74. A guide comprises a laterally adjustable guide member 90 including an adjustment knob 92 and arcuate guide slot 94 formed through one of the substantially parallel side plates or members 74 guides the vertical travel of the elongated member or bar 72 as the elongated member or bar 72 is pivoted or rotated about the bar mounting member or bolt 86. A vertical positioning retention member 96 having an outwardly biased depressable retention button 98 extends through one of a plurality of corresponding pairs of apertures each indicated as 100 formed in alignment on the substantially parallel side plates or members 74 and a pivot hole or channel 102 formed through the proximal end portion of elongated member or bar 72.

As best shown in FIGS. 1 through 3, the distal bracket mount 70 comprises a pair of substantially parallel side plates or members 104 affixed to an accessory mounted plate 106 having a plurality of accessory mounting apertures or holes each indicated as 108 to mount an accessory thereon with fasteners extending through the aperture or hole pattern corresponding to at least two of the mounting apertures or holes 108. The distal end portion of the elongated member or bar 72 is pivotally mounted between the substantially parallel side plates or members 104 by a bar indicated as 100 formed in alignment on the substantially parallel side plates or members 74 and a pivot hole or channel 102 formed through the proximal end portion of elongated member or bar 72.

As best shown in FIGS. 1 through 3, the distal bracket mount 70 comprises a pair of substantially parallel side plates or members 104 affixed to an accessory mounted plate 106 having a plurality of accessory mounting apertures or holes each indicated as 108 to mount an accessory thereon with fasteners extending through the aperture or hole pattern corresponding to at least two of the mounting apertures or holes 108. The distal end portion of the elongated member or bar 72 is pivotally mounted between the substantially parallel side plates or members 104 by a bar mounting member or bolt 110. A washer or spacer (not shown) may be disposed between each side of the elongated member or bar 72 in the inside surface of each substantially parallel side plate or member 104. A vertical positioning retention member 112 extends through one of a plurality of corresponding pairs of apertures each indicated as 114 formed in alignment on the substantially parallel side plates or members 104 and a pivot hole or channel (not shown) formed through the distal end portions of the elongated member or bar 72.

Figure 10:
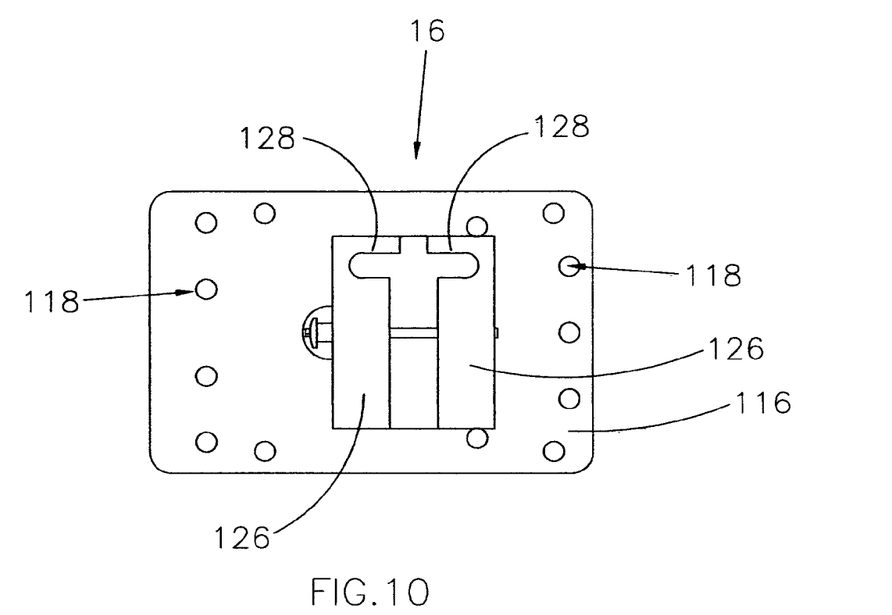
FIG. 10 is a detailed rear view of an alternate embodiment of the accessory mount assembly.
Figure 11:
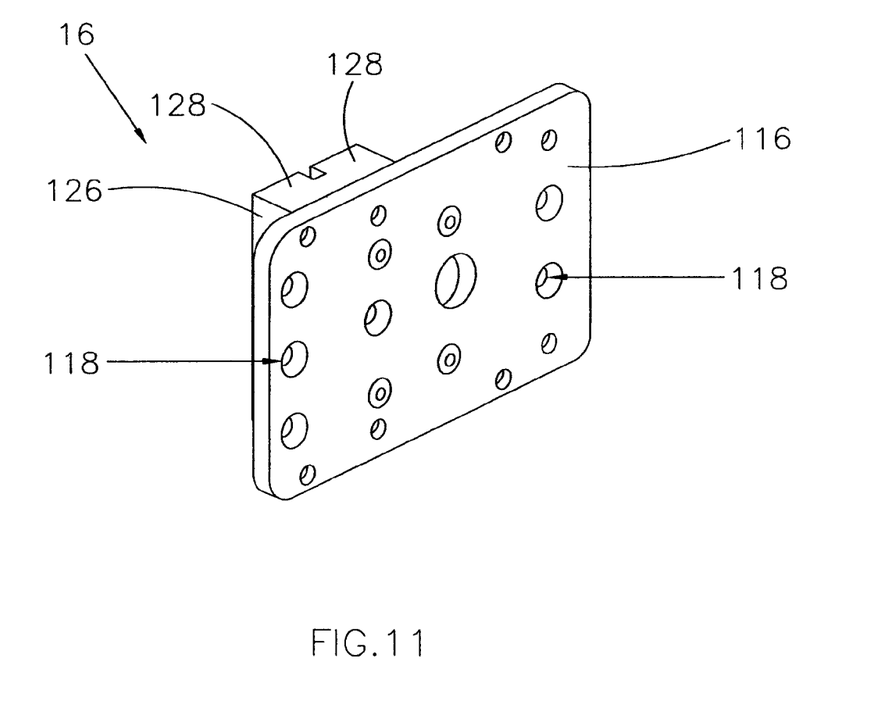
FIG. 11 is a detailed perspective view of the alternate embodiment of the accessory mount assembly shown in FIG. 10.

FIGS. 10 and 11 show an alternate embodiment of the accessory mount assembly 16. Specifically, the accessory mount assembly 16 comprises an accessory mounting plate 116 having a plurality of accessory mounting apertures or holes each indicated as 118.

As shown in FIGS. 2 through 9, the intermediate coupler 18 comprises a first coupler generally indicated as 120 formed on at least one of the pair of pole mounting members 24 of the pole mount assembly 14 and a second coupler generally indicated as 122 formed on the proximal bracket mount 68 of the accessory mount assembly 16 configured to operatively engage each other to mount the accessory mount assembly 16 to the pole mount assembly 14. The first coupler 120 comprises a pair of grooves each indicated as 124 on at least one pair of pole mounting members 24 of the pole mount assembly 14 to receive a corresponding pair of tongues 126 formed on the proximal portions of the substantially parallel side plates or members 74 of the proximal bracket mount 68 and a corresponding pair of stops 128 formed on the substantially parallel side plates or members 74 of the proximal bracket mount 68 above the corresponding tongue 126 to limit the downward movement of the accessory mount assembly 16 relative to the pole mount assembly 14 to fix the height of the accessory mount assembly 16 on the elevated pole or mast 20 of the mobile elevated pole or mast assembly 12.

In use, the pole mount assembly 14 is secured to the elevated pole or mast 20 of the mobile elevated pole or mast assembly 12 at the desired height as previously described. The accessory mount assembly 16 is mounted to the pole mount assembly 14 by inserting the tongues 126 of the second coupler 122 into the corresponding grooves 124 of the first coupler 120 until the stops or limits 128 rest on or engage the corresponding pair of pole mounting members 24 of the pole mount assembly 14.

The elongated member or bar 72 is then pivoted about the bar mounting member or bolt 86 to the desired angular position and held in place by inserting the vertical positioning retention member 96 through corresponding apertures 100 and the pivot hold or channel 102. The pole mount assembly 14 and elongated member or bar 72 are secured in place relative to the pole mount assembly 14 and proximal bracket mount 68 respectively by tightening the adjustment knob 82 and the adjustment knob 92 respectively. Finally, the distal bracket mount 70 is similarly positioned and held in place.

Once assembled and so positioned, the accessory (not shown) is secured to the accessory mounted plate 106 by means of fasteners and the appropriate accessory mounting apertures or holes 108.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A mast mount system for mounting accessories on an elevated pole or mast for field communications, surveillance, lightning protection, or weather station, comprising a pole mount assembly configured to engage and secure said mast mount system to a periphery of the elevated pole or mast and an accessory mount assembly coupled to said pole mount assembly by an intermediate coupler, said accessory mount assembly comprises an elongated accessory attachment arm having a proximal end portion and a distal end portion pivotally mounted to said intermediate coupler at the proximal end portion thereof by a proximal bracket mount and a distal bracket mount pivotally mounted to the distal end portion thereof for supporting the accessories thereon such that the accessories are positioned relative to the elevated pole or mast by said elongated accessory attachment arm at either or both said proximal end portion and said distal end portion thereof without the use of a tool, said pole mount assembly comprising a mounting collar including a pair of pole mounting clamp members each including an inner concave pole or mast engagement surface hingedly coupled together by a hinge member extending through at least one hinge sleeve formed on corresponding end portions of each said pole mounting clamp member for engaging and securing said mounting collar of said pole mount assembly to the periphery of the elevated pole or mast, said mounting collar of said pole mount assembly further comprising at least one collar securing assembly configured to secure said pole mount assembly of said mast mount system to the elevated pole or mast wherein said at least one collar securing assembly comprises a first collar extension including a first securing surface having a securing notch formed thereon on said end portion of one of said pole mounting clamp members opposite said corresponding hinge sleeve formed on said same pole mounting clamp member and a first outer securing surface and a second collar extension including a second securing surface having a securing groove formed on said end portion of said other of said pole mounting clamp members opposite said corresponding hinge sleeve formed on said same pole mounting clamp member and a second outer securing surface wherein said first securing surface and said second securing surface are held in operative engagement relative to each other when a collar locking member is secured in a locked position for securing said mounting collar of said pole mount assembly in place on said elevated pole or mast of a mobile elevated pole or mast assembly and wherein said collar locking member comprises an elongated member coupled to said first collar extension by a pivot member rotatably disposed within a recess disposed adjacent said notch by a plurality of external threads formed on one end of said elongated member operatively engaging a plurality of internally disposed threads formed within said pivot member.

2. The mast mount system of claim 1 wherein said collar securing assembly further includes a locking knob including a reduced locking portion having a collar locking surface and an enlarged lock positioning member.

3. The mast mount system of claim 1 wherein said collar securing assembly includes a pair of collar locking members disposed vertically relative to each other and having said locking knobs disposed on opposite sides of said first securing surface and said second securing surface.

4. The mast mount system of claim 1 wherein said intermediate coupler comprises a first coupler formed on at least one of said pair of pole mounting clamp members of said pole mount assembly and a second coupler formed on said proximal bracket mount of said accessory mount assembly configured to operatively engage each other to mount said accessory mount assembly to the pole mount assembly.

5. The mast mount system of claim 4 wherein said first coupler comprises a pair of grooves on said at least one of said pair of pole mounting clamp members of said pole mount assembly to receive a corresponding pair of tongues formed on proximal portions of substantially parallel side plates of said proximal bracket mount and a corresponding pair of stops formed on said substantially parallel side plates of said proximal bracket mount above said corresponding pair of tongues to limit the downward movement of said accessory mount assembly relative to said pole mount assembly for fixing a height of said accessory mount assembly on the elevated pole or mast of the mobile elevated pole or mast assembly.

6. The mast mount system of claim 1 wherein said hinge member is secured with said hinge sleeve of each said pole mounting clamp member by a ring retainer coupled to a lower end portion of said hinge member.

7. The mast mount system of claim 1 wherein said pole mount assembly is configured to be secured to said elevated pole or mast at a desired height and said accessory mount assembly is mounted to said pole mount assembly by inserting a pair of tongues of a second coupler into a corresponding pair of grooves of a first coupler until a pair of stops or limits rests on or engages said pair of pole mounting clamp members.

8. A mast mount system for mounting accessories on an elevated pole or mast for field communications, surveillance, lightning protection, or weather station, comprising a pole mount assembly configured to engage and secure said mast mount system to a periphery of the elevated pole or mast and an accessory mount assembly coupled to said pole mount assembly by an intermediate coupler, said accessory mount assembly comprises an elongated accessory attachment arm having a proximal end portion and a distal end portion pivotally mounted to said intermediate coupler at the proximal end portion thereof by a proximal bracket mount and a distal bracket mount pivotally mounted to the distal end portion thereof for supporting the accessories thereon such that the accessories are positioned relative to the elevated pole or mast by said elongated accessory attachment arm at either or both said proximal end portion and said distal end portion thereof without the use of a tool, wherein said proximal bracket mount comprises a pair of substantially parallel side members held in a spaced relationship relative to each other by at least one spacer held in place by a fastener at each end thereof in cooperation with a laterally adjustable fastening member including an adjustment knob formed on one end portion thereof and held in place by a second fastener wherein said proximal end portion of said elongated accessory attachment arm is pivotally mounted between said substantially parallel side members by a bar mounting member.

9. The mast mount system of claim 8 wherein said proximal bracket mount includes a guide comprising a laterally adjustable guide member including an adjustment knob and an arcuate guide slot formed through one of said substantially parallel side members guides the vertical travel of said elongated accessory attachment arm as said elongated accessory attachment arm rotates about said bar mounting member.

10. The mast mount system of claim 9 wherein said proximal bracket mount further includes a vertical positioning retention member having an outwardly biased depressable retention button extending through one of a plurality of corresponding pairs of apertures formed in alignment on said substantially parallel side members and a pivot hole or channel formed through said proximal end portion of said elongated accessory attachment arm.

11. A mast mount system for mounting accessories on an elevated pole or mast for field communications, surveillance, lightning protection, or weather station, comprising a pole mount assembly configured to engage and secure said mast mount system to a periphery of the elevated pole or mast and an accessory mount assembly coupled to said pole mount assembly by an intermediate coupler, said accessory mount assembly comprises an elongated accessory attachment arm having a proximal end portion and a distal end portion pivotally mounted to said intermediate coupler at the proximal end portion thereof by a proximal bracket mount and a distal bracket mount pivotally mounted to the distal end portion thereof for supporting the accessories thereon such that the accessories are positioned relative to the elevated pole or mast by said elongated accessory attachment arm at either or both said proximal end portion and said distal end portion thereof without the use of a tool, wherein said distal bracket mount comprises a pair of substantially parallel side members affixed to an accessory mounted plate having a plurality of accessory mounting apertures for mounting the accessories thereon with fasteners extending through an aperture pattern corresponding to at least two of the mounting apertures, said distal end portion of said elongated accessory attachment arm is pivotally mounted between said substantially parallel side members by a bar mounting member and said distal bracket mount includes a vertical positioning retention member extending through one of a plurality of corresponding pairs of apertures formed in alignment on said substantially parallel side members and a pivot hole or channel formed through said distal end portion of said elongated accessory attachment arm.

12. A mast mount system for mounting accessories on an elevated pole or mast for field communications, surveillance, lightning protection, or weather station, comprising a pole mount assembly including a mounting collar comprising a pair of hingedly coupled pole mounting clamp members configured to engage and secure the mounting collar to a periphery of the elevated pole or mast and an accessory mount assembly coupled to said pole mount assembly by an intermediate coupler, said accessory mount assembly comprises an elongated accessory attachment arm having a proximal end portion and a distal end portion pivotally mounted to said intermediate coupler at the proximal end portion thereof by a proximal bracket mount and a distal bracket mount pivotally mounted to the distal end portion thereof for supporting the accessories thereon such that the accessories are positioned relative to the elevated pole or mast by said elongated accessory attachment arm at either or both the proximal and distal end portions thereof without the use of a tool, said pole mounting clamp members each including an inner concave pole or mast engagement surface hingedly coupled together by a hinge member extending through at least one hinge sleeve formed on corresponding end portions of each said pole mounting clamp member for engaging and securing said mounting collar of said pole mount assembly to the periphery of the elevated pole or mast, said proximal bracket mount comprises a pair of substantially parallel side members held in a spaced relationship relative to each other by at least one spacer held in place by a fastener at each end thereof in cooperation with a laterally adjustable fastening member formed on one end portion thereof and held in place by a second fastener wherein said proximal end portion of said elongated accessory attachment arm is pivotally mounted between said substantially parallel side members by a bar mounting member, said distal bracket mount comprises a pair of substantially parallel side members affixed to an accessory mounted plate having a plurality of accessory mounting apertures configured to mount the accessories thereon with a plurality of fasteners extending through an aperture pattern corresponding to at least two of said mounting apertures, said distal end portion of said elongated accessory attachment arm is pivotally mounted between said substantially parallel side members of said distal bracket mount by a second bar mounting member, said intermediate coupler comprises a first coupler formed on at least one of the pair of pole mounting clamp members of said pole mount assembly and a second coupler formed on said proximal bracket mount of said accessory mount assembly configured to operatively engage each other to mount said accessory mount assembly to the pole mount assembly.

13. The mast mount system of claim 12 wherein said mounting collar of said pole mount assembly further comprises at least one collar securing assembly configured to secure said pole mount assembly of said mast mount system to the elevated pole or mast, said proximal bracket mount further includes a vertical positioning retention member having an outwardly biased depressable retention button extending through one of a plurality of corresponding pairs of apertures formed in alignment on said substantially parallel side members of said proximal bracket mount and a pivot hole or channel formed through said proximal end portion of said elongated accessory attachment arm, said distal bracket mount includes a vertical positioning retention member extending through one of a plurality of corresponding pairs of apertures formed in alignment on said substantially parallel side members of said distal bracket mount and a pivot hole or channel formed through said distal end portion of said elongated accessory attachment arm.

14. The mast mount system of claim 13 wherein said at least one collar securing assembly comprises a first collar extension including a first securing surface having a securing notch formed thereon on said end portion of one of said pole mounting clamp members opposite said corresponding hinge sleeve formed on said same pole mounting clamp member and a first outer securing surface and a second collar extension including a second securing surface having a securing groove formed on said end portion of said other of said pole movement clamp members opposite said corresponding hinge sleeve formed on said same pole mounting clamp member and a second outer securing surface wherein the first securing surface and said second securing surface are held in operative engagement relative to each other when a collar locking member is secured in a locked position for securing said mounting collar of said pole mount assembly in place on the elevated pole or mast wherein said first coupler comprises a pair of grooves on at least one pair of said pole mounting clamp members of said pole mount assembly to receive a corresponding pair of tongues formed on proximal portions of said substantially parallel side members of said proximal bracket mount and a corresponding pair of stops formed on said substantially parallel side members of said proximal bracket mount above said corresponding pair of tongues to limit the downward movement of said accessory mount assembly relative to said pole mount assembly for fixing a height of said accessory mount assembly on the elevated pole or mast.

15. The mast mount system of claim 14 wherein said collar locking member comprises an elongated member coupled to said first collar extension by a pivot member rotatably disposed within a recess disposed adjacent the notch by a plurality of external threads formed on one end of said elongated member operatively engaging a plurality of internally disposed threads formed within said pivot member.

16. The mast mount system of claim 13 wherein said proximal bracket mount includes a guide comprising a laterally adjustable guide member including an adjustment knob and an arcuate guide slot formed through one of said substantially parallel side members of said proximal bracket mount guides the vertical travel of said elongated accessory attachment arm as said elongated accessory attachment arm is rotated about said bar mounting member of said proximal bracket mount.

17. The mast mount system of claim 12 wherein at least one collar securing assembly of said at least mounting collar of said pole mount assembly comprises a first collar extension including a first securing surface having a securing notch formed thereon on said end portion of one of said pole mounting clamp members opposite said corresponding hinge sleeve formed on said same pole mounting clamp member and a first outer securing surface and a second collar extension including a second securing surface having a securing groove formed on said end portion of said other of said pole mounting clamp members opposite said corresponding hinge sleeve formed on said same pole mounting clamp member and a second outer securing surface wherein the first securing surface and said second securing surface are held in operative engagement relative to each other when a collar locking member is secured in a locked position for securing said mounting collar of said pole mount assembly in place on said elevated pole or mast.

18. The mast mount system of claim 17 wherein said collar locking member comprises an elongated member coupled to said first collar extension by a pivot member rotatably disposed within a recess disposed adjacent the notch by a plurality of external threads formed on one end of said elongated member operatively engaging a plurality of internally disposed threads formed within said pivot member.

* * * * *